Dec. 16, 1924.
J. R. KEOGH
METALLIC PACKING
Filed June 29, 1922
1,519,845
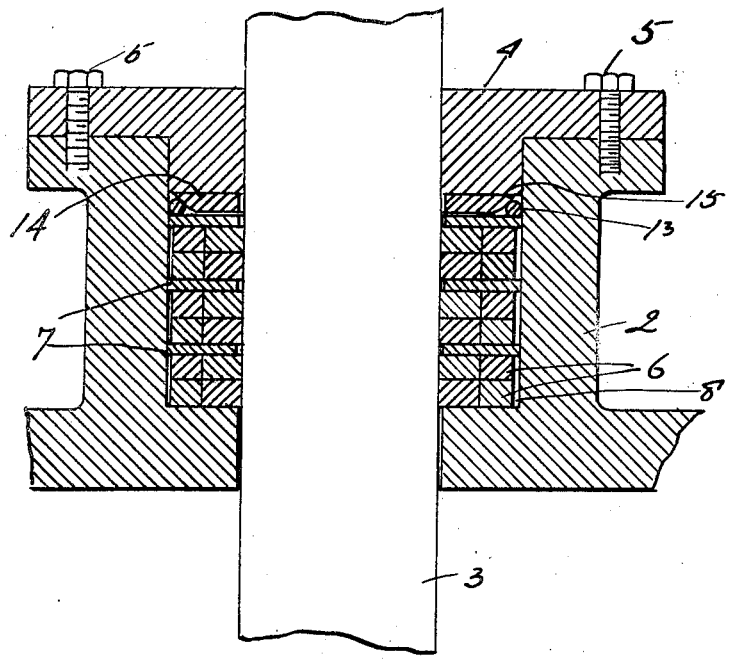
Fig. 1.
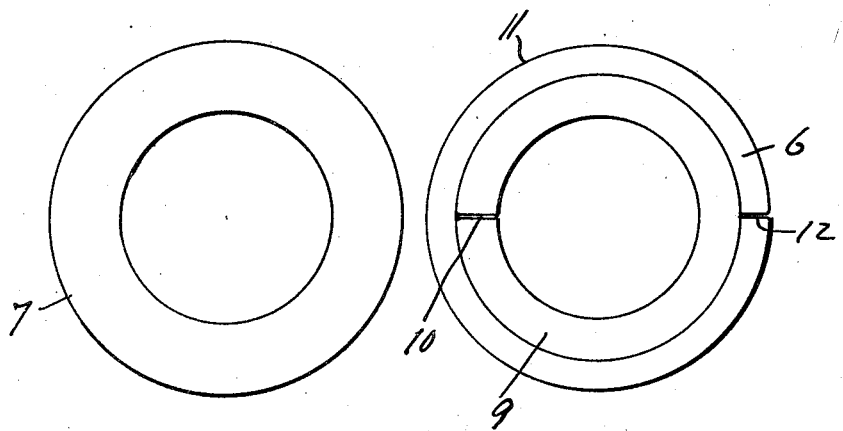
Fig. 2.
Fig. 3.
INVENTOR
James R. Keogh
By W. W. Williamson Atty.

Patented Dec. 16, 1924.

1,519,845

UNITED STATES PATENT OFFICE.

JAMES R. KEOGH, OF PHILADELPHIA, PENNSYLVANIA.

METALLIC PACKING.

Application filed June 29, 1922. Serial No. 571,635.

*To all whom it may concern:*

Be it known that I, JAMES R. KEOGH, a citizen of the United States, residing at Philadelphia, in the county of Philadelphia and State of Pennsylvania, have invented new and useful Improvements in a Metallic Packing, of which the following is a specification.

My invention relates to new and useful improvements in a metallic packing which is particularly adapted for use in a stuffing box to make a tight joint for piston rods, valve stems or the like.

The main object of this invention is to construct a metallic packing which when in use will produce a water-lock or water-baffle to prevent the escape of steam, gases or fluids.

Another object of my invention is to so arrange a number of packing rings and separator rings as to produce pockets or chambers for the reception of waters of condensation which will act as one of the packing elements.

Generally stated, the invention resides in a packing comprising a series of packing rings, the diameters of which are contractible in order that they may be forced into close contact with a rod or the like, separator rings interposed between pluralities of said packing rings, said separator rings each having a bore of larger diameter than the rod or other object on which they are mounted and means to seal the outer end of the packing.

With these ends in view, this invention consists in the details of construction and combination of elements hereinafter set forth and then specifically designated by the claims.

In order that those skilled in the art to which this invention appertains, may understand how to make and use the same, I will describe its construction in detail, referring by numerals to the accompanying drawing forming a part of this application, in which:—

Fig. 1, is a longitudinal sectional view of a complete stuffing box applied to a rod and embodying my invention.

Fig. 2, is a face view of a separator ring.

Fig. 3, is a similar view of the preferred form of packing ring.

In carrying out my invention as here embodied, 2 represents a stuffing box, 3 a rod passing therethrough, 4 the gland and 5 suitable tightening devices here shown as bolts passing through the gland and having threaded connection with the stuffing box.

The numeral 6 denotes a series or plurality of packing rings split as indicated at 12 which are capable of being contracted about the rod 3 and said packing rings are preferably arranged in pairs with separator rings 7 located between each pair of packing rings as well as beyond the outermost packing ring.

The packing rings 6 are constructed to snugly fit the rod 3 but have an outside diameter smaller than the diameter of the interior of the stuffing box, thus leaving a space or pocket 8 to hold water of condensation while the separator rings have a larger outside diameter than the packing rings but substantially the same as the inside diameter of the stuffing box so as to snugly fit therein although the inner diameter of said separator rings is larger than the diameter of the rod.

In practice it has been found that the separator rings 7 should be about five one-thousandths smaller than the interior of the stuffing box with an inside diameter of approximately ten one-thousandths of an inch larger than the rod so as to leave spaces between the separator rings and the rod for the passage of steam or water of condensation.

As the rings are only semi-finished leakage is permitted between the spaces left at the outer edges of the packing rings and the inner edge of the separator rings, thus forming a continuous passage from one end of the stuffing box to the other end, back and forth from the rod to the side wall of the box, which passage being circuitous causes a gradual reduction of pressure and a condensation of the steam entering the box during such passage. It will be apparent that as the steam condenses within these passageways and spaces a film of condensate is left around and between the rings.

Although I do not care to be held to the specific structure of packing ring herein shown I find that very good results are obtained when the packing ring is constructed as shown in Fig. 3. This packing ring consists of an inner annulus 9 split at one point as indicated at 10 so as to be expansible and contractible.

Packing rings constructed in this manner, when surrounded by waters of condensation or steam under pressure will be caused to contract and form a tight joint about the rod or other object on which they are mounted.

The packing and separator rings being mounted in the stuffing box, as shown in Fig. 1, a soft compressible ring or packing 13 is placed against the outer face of the outermost separator ring and then compressed by the follower ring 14 having a chamfered or arcuate perimeter in cross section, as indicated at 15, which contacts with the soft packing 13 to form a tight joint and prevent the escape of water of condensation.

During operation steam will be forced into the stuffing box at its inner end about the rod 3 and then travel radially between the innermost packing ring and the inner end of the stuffing box to the space or pocket 8 around the outer edges of the innermost packing rings and then inward radially between the inner set of packing rings and the adjacent separator ring, then through the bore of the separator ring about the rod and then again outward radially between said separator ring and the next set of packing rings into the pockets around the outer edges of said last named packing rings. This circuitous passage of the steam continues according to the number of packing rings and separator rings in the stuffing box.

The steam entering the passageways and pockets hereinbefore described will condense within the spaces at the ring edges as well as between the ring faces and be prevented from escape by the joint formed through the medium of the soft packing ring 13 and these waters of condensation will form a water lock or baffle to absolutely prevent the escape of steam through the packing and since the pressure of the steam is always acting upon said waters of condensation the contractible rings will be tightly held against the rod to prevent the escape of any steam about said rod. By placing a plurality of packing rings and separator rings in the stuffing box, a series of baffles or throttles are provided which will impede the flow of fluid through the stuffing box whether such fluid be oil or a condensate of steam and the like and this fluid in the stuffing box about the different rings provides a seal of such proportions that it will hold against the pressure of steam or other fluid in a cylinder to which such a packing is applied.

Of course I do not wish to be limited to the exact details of construction as herein shown as these may be varied within the limits of the appended claims without departing from the spirit of my invention.

Having thus fully described my invention, what I claim as new and useful is:—

1. A metallic packing comprising in combination with a stuffing box and a rod passing therethrough, a series of contractible packing rings, separator rings interposed between certain of said packing rings and in conjunction with said packing rings box and rod forming a circuitous passageway between said ring faces and edges to hold water of condensation which produces a water lock or baffle and acts as one of the packing elements, and means for forming a closure at the outer end of the stuffing box.

2. A metallic packing comprising a stuffing box, a plurality of packing rings located in said stuffing box so as to form pockets and separator rings located between the groups of said packing rings to separate the pockets and form circuitous passageways between adjacent pockets, whereby water of condensation will be entrapped within said pockets and passageways.

3. A metallic packing comprising a stuffing box, a plurality of packing rings located in said stuffing box so as to form pockets to hold water of condensation, separator rings located between the groups of said packing rings to separate the pockets and form circuitous passageways between adjacent pockets, a compressible packing engaging the outer separator ring and a follower ring coacting with the compressible ring and forced toward the latter by means of the stuffing box gland.

4. In combination with a stuffing box and a rod passing therethrough, a series of rings contacting with the walls of the stuffing box a series of rings contacting with the rod to produce pockets and circuitous passageways to hold water of condensation for preventing the escape of steam through the packing.

5. A fluid seal packing comprising a stuffing box, a rod passing therethrough, a series of packing rings surrounding said rod in staggered relation to each other forming a staggered series of pockets having connections therebetween for entrapping condensation water.

6. A fluid seal packing comprising the combination with a stuffing box and a rod extending therethrough, of a plurality of rings surrounding the rod within the stuffing box constructed so as to form a passage for condensation water in said stuffing box between the walls thereof, the rings and rod.

7. A fluid seal packing comprising a stuffing box, a rod extending therethrough, a plurality of packing rings within the stuffing box and surrounding said rod, said packing rings being arranged in sets, separator rings within the stuffing box and surrounding the rod and arranged between the sets of packing rings, so arranged as to form a passage for condensation water within the stuffing box between the different rings and between said rings and the walls of the stuffing box and rod.

8. A fluid seal packing comprising a stuffing box and a rod passing therethrough, members encompassing said rod within said box, and means permitting the formation of a film of condensate between said members.

In testimony whereof, I have hereunto affixed my signature.

JAMES R. KEOGH.